(12) United States Patent
Wu et al.

(10) Patent No.: US 8,243,144 B2
(45) Date of Patent: Aug. 14, 2012

(54) LIGHT TRANSPORT MATRIX FROM HOMOGRAPHY

(75) Inventors: Chenyu Wu, Mountain View, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 536 days.

(21) Appl. No.: 12/533,838

(22) Filed: Jul. 31, 2009

(65) Prior Publication Data

US 2011/0025929 A1    Feb. 3, 2011

(51) Int. Cl.
*H04N 3/22* (2006.01)
*H04N 17/00* (2006.01)
*G06K 9/32* (2006.01)

(52) U.S. Cl. .................. 348/189; 382/295; 348/745

(58) Field of Classification Search .............. 382/293, 382/295; 348/189–191, 744, 745
See application file for complete search history.

(56) References Cited

U.S. PATENT DOCUMENTS

| | | | |
|---|---|---|---|
| 6,549,203 B2 | 4/2003 | Randel | |
| 6,628,892 B2 | 9/2003 | Tsumagari et al. | |
| 6,811,264 B2 | 11/2004 | Rasker et al. | |
| 6,903,738 B2 | 6/2005 | Pfister et al. | |
| 7,137,707 B2 | 11/2006 | Beardsley et al. | |
| 7,218,324 B2 | 5/2007 | Pfister et al. | |
| 2002/0059042 A1 | 5/2002 | Kacyra et al. | |
| 2003/0052837 A1 | 3/2003 | Raskar | |
| 2004/0113939 A1 | 6/2004 | Zacks et al. | |
| 2004/0119729 A1 | 6/2004 | Covannon et al. | |
| 2005/0074162 A1 | 4/2005 | Tu et al. | |
| 2006/0092329 A1* | 5/2006 | Noji ............... | 348/607 |
| 2007/0171381 A1 | 7/2007 | Tan et al. | |
| 2007/0171382 A1 | 7/2007 | Tan et al. | |
| 2008/0174704 A1 | 7/2008 | Tan et al. | |
| 2009/0086081 A1* | 4/2009 | Tan et al. ............ | 348/333.1 |

OTHER PUBLICATIONS

Nasu, O., et al., "Analysis of Light Transport based on the Separation of Direct and Indirect Components", IEEE Conference on Computer Vision and Pattern Recognition, pp. 1-2, Jun. 17-22 2007.
Cheslack-Postava, E., et al., "4D Compression and Relighting with High-Resolution Light Transport Matrices", Proceedings of the 2007 symposium on Interactive 3D graphics and games, pp. 81-88, 2007.
Lehtinen, J., et al., "A Meshless Hierarchical Representation for Light Transport", ACM Transactions on Graphics 27 (3), Proceedings of SIGGRAPH 2008.
Zhang, Z., "A Flexible New Technique for Camera Calibration", Technical Report MSR-TR-98-71, Microsoft Research, Dec. 2, 1998, pp. 1-21.
Sen, P., et al., "Dual Photography", ACM SIGGRAPH Jan. 2005 Conference Proceedings, pp. 1-11.
Seitz, S., et al., A Theory of Inverse Light Transport, Proceedings of International Conference on Computer Vision (ICCV), vol. 2, 1440-1447, Oct. 2005.

(Continued)

*Primary Examiner* — Timothy J Henn

(57) ABSTRACT

Aspects of the present invention include systems and methods for obtaining a light transport between a projector and a camera. In embodiments, the light transport between the projector and the camera is represented as a matrix and is obtained assuming that the projector displays on a surface that is planar or at least substantially planar. The light transport matrix is obtained by finding a homography between the projector and the camera. Using the homography to correlate camera and projector pixels and using color values in a captured solid color image, the light transport matrix can be obtained. In embodiments, at least an approximation of an inverse light transport matrix can also be computed, which is useful for many applications, such as inferring unknown projector images.

16 Claims, 9 Drawing Sheets

OTHER PUBLICATIONS

Raskar, R., et al., "iLamps Geometrically Aware and Self-Configuring Projectors", Mitsubishi Electric Research Labs (MERL), Cambridge MA, USA, pp. 809-818, Jan. 2003.

Jiang, X., "An Adaptive Contour Closure Algorithm and its Experimental Evaluation", IEEE Transactions on Pattern Analysis and Machine Intelligence, vol. 22, No. 11, pp. 1252-1265, Nov. 2000.

* cited by examiner

200

```
┌─────────────────────────────────────┐
│ Project a set of feature points      │
│ using the projector and capture      │─── 205
│ the feature points with the camera   │
└─────────────────────────────────────┘
                  │
                  ▼
┌─────────────────────────────────────┐
│ Using the feature points, calculate  │
│ a homography between the projector   │─── 210
│ and the camera                       │
└─────────────────────────────────────┘
                  │
                  ▼
┌─────────────────────────────────────┐
│ Project a solid color image using    │─── 215
│ the projector and capture the image  │
│ with the camera                      │
└─────────────────────────────────────┘
                  │
                  ▼
┌─────────────────────────────────────┐
│ Compute a light transport matrix     │
│ using color values from the captured │
│ solid color image and using the      │─── 220
│ homography transform to identify     │
│ correspondence between camera        │
│ pixels and projector pixels          │
└─────────────────────────────────────┘
                  │
                  ▼
┌─────────────────────────────────────┐
│ Compute at least an approximation    │─── 225
│ of the inverse light transport matrix│
└─────────────────────────────────────┘
```

$$C_{n \times 1} = T_{n \times m} \cdot P_{m \times 1}$$

$$640 \left[\begin{array}{c} c_1 \\ c_2 \\ c_3 \\ \vdots \\ \vdots \\ c_n \end{array}\right] = \left[\begin{array}{cccc} t_{11} & t_{12} & & t_{1m} \\ t_{21} & t_{22} & & t_{2m} \\ t_{31} & t_{32} & & t_{3m} \\ & & \cdots & \\ \vdots & \vdots & & \vdots \\ t_{n1} & t_{n2} & & t_{nm} \end{array}\right] \left[\begin{array}{c} p_1 \\ p_2 \\ p_3 \\ \vdots \\ \vdots \\ p_m \end{array}\right] 660$$

650 in $t_{32}$ position

FIGURE 6

LIGHT TRANSPORT MATRIX FROM HOMOGRAPHY

CROSS-REFERENCE TO RELATED APPLICATIONS

This application is related to U.S. patent application Ser. No. 11/623,016, filed on Jan. 12, 2007 (Pub. No. US 2007/0171382 A1), which claims the benefit of U.S. patent application Ser. No. 11/613,129, filed Dec. 19, 2006, which claims the benefit under 35 U.S.C. §119(e) of U.S. Provisional Patent Application No. 60/762,178, filed Jan. 24, 2006, each of which incorporated by reference herein in its entirety.

This application is also related to U.S. patent application Ser. No. 12/329,099, filed on Dec. 5, 2008 (Pub. No. US 2009/0086081 A1), which is a continuation-in-part of and claims the benefit of U.S. patent application Ser. No. 11/623,016, filed on Jan. 12, 2007, which claims the benefit of U.S. patent application Ser. No. 11/613,129, filed Dec. 19, 2006, which claims the benefit under 35 U.S.C. §119(e) of U.S. Provisional Patent Application No. 60/762,178, filed Jan. 24, 2006, each of which is incorporated herein by reference in its entirety.

BACKGROUND

A. Technical Field

The present invention pertains generally to image processing, and relates more particularly to obtaining a light transport matrix.

B. Background of the Invention

The prevalence of computers and the dramatic increase in both the amount and the availability of multimedia content have resulted in the ubiquity of projector systems. Projectors are no longer found only in professional settings such as theaters. Rather, projectors can also be found in businesses (both large corporations and small businesses), in schools, and in residences.

Because projectors can exist in different environments and can be used in different ways, it is important that they be able to be configured to display images properly. To display images properly, the images should be projected so that they are properly perceived by the intended viewing audience.

Configuring a projector system can be difficult because it involves determining how the images should be projected so that they can be viewed as intended. A person cannot assume that if the images are correct when projected that they will be perceived in the same way. The display environment in which the projection and the viewer exist can result in distorted images. Accordingly, it is important that projector systems be properly configured for their display environment.

SUMMARY OF THE INVENTION

Aspects of the present invention include systems and methods for computing a light transport matrix using homography. In embodiments, a method for obtaining a light transport matrix between a camera and a projector comprises projecting a set of features on a surface assumed to be planar, capturing the set of features using the camera, and using the set of features to calculate a homography transform from the projector pixels and the camera pixels. A homogeneous color image is projected using the projector and an image of the projected homogenous color image is captured using the camera. For each camera pixel of a set of camera pixels (i.e., all or a portion of the camera pixels), an inverse of the homography transform is used to identify a corresponding projector pixel. Given the camera pixel and its corresponding projector pixel, a corresponding entry in the light transport matrix is identified and its value can be filled in based upon the color value of the camera pixel from the captured image of the homogenous color image. In embodiments, the corresponding entry in the light transport matrix is determined from the location of the camera pixel and the location of the projector image pixel. For example, in embodiments, the corresponding entry in the light transport matrix has a row position equal to a row position of the camera pixel and has a column position equal to the row of the camera pixel's corresponding projector pixel.

In embodiments, the light transport matrix may be used to obtain at least an approximation of an inverse of the light transport matrix. In embodiments, the at least an approximation of an inverse of the light transport matrix is obtained by normalizing the light transport matrix and transposing the normalized light transport matrix. In embodiments, the at least an approximation of an inverse of the light transport matrix is used to alter an image that is to be projected using the projector.

In embodiments, one or more of the above-listed processes may be repeated for a different view position.

In embodiment, the present invention may be implemented as a computer-readable medium carrying one or more sequences of instructions, wherein execution of the one or more sequences of instructions by one or more processors causes the one or more processors to obtain a light transport matrix between a projector and a view position by performing certain steps. In embodiments, the steps comprise: correlating a first set of camera pixels with a set of projector pixels using a set of features projected by the projector onto a surface that is at least substantially planar and captured by a camera at the view position; and using the first set of camera pixels that are correlated with the set of projector pixels to calculate a homography transform from the camera pixels to the projector pixels. And, for each camera pixel of a second set of camera pixels, performing the steps comprising: using the homography transform to identify a corresponding projector pixel; using the camera pixel and the corresponding projector pixel to identify a corresponding entry in the light transport matrix; and adding a color value to the corresponding entry in the light transport matrix, the color value being based upon color information of the camera pixel from a captured image of a homogenous color image projected by the projector.

In embodiments, the computer-readable medium further comprises one or more sequences of instructions, wherein execution of the one or more sequences of instructions by one or more processors causes the one or more processors to perform the steps comprising using the light transport matrix to obtain at least an approximation of an inverse of the light transport matrix. In embodiments, an approximation of the inverse of the light transport matrix may be used to alter an image that is to be projected using the projector.

In embodiments, a system for obtaining a light transport matrix between a camera and a projector comprises a feature point detector, a homography calculator, and a light transport calculator. In embodiments, the feature point detector correlates a first set of camera pixels with a set of projector pixels using a set of features projected by the projector on a surface that is at least substantially planar and captured by a camera at the view position. In embodiments, the homography calculator is communicatively coupled to receive the correlated first set of camera pixels and projector pixels and uses the first set of camera pixels that are correlated with the set of projector pixels to obtain a homography transform between the camera pixels and the projector pixels. In embodiments, the light transport calculator is communicatively coupled to receive the homography transform between the camera pixels and the projector pixels, and, for each camera pixel of a second set of camera pixels, performs the steps comprising: using the homography transform to identify a corresponding projector pixel; using the camera pixel and the corresponding projector pixel to identify a corresponding entry in a light transport matrix relating the camera to the projector; and adding a color value to the corresponding entry in the light transport matrix. In embodiments, the color value is based upon color information at the camera pixel from a captured image of a homogenous color image projected by the projector.

In embodiments, the system further comprises an inverse light transport calculator that is communicatively coupled to receive the light transport matrix and that computes at least an approximation of an inverse of the light transport matrix.

In embodiments, the system also comprises a projector driver that is communicatively coupled to receive the at least an approximation of an inverse of the light transport matrix and that adjusts a projector image according to the at least an approximation of an inverse of the light transport matrix. In embodiments, the projector driver causes the projector to project the set of features on the surface that is at least substantially planar and causes the projector to project the homogeneous color image.

In embodiments, the system also comprises a camera driver that is communicatively coupled to the camera and that causes the camera to capture the set of features and that causes the camera to capture the captured image of the homogenous color image projected by the projector.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 2 depicts a method for obtaining a light transport matrix and at least an approximation of an inverse of the light transport matrix according to various embodiments of the invention.

FIG. 6 illustrates obtaining entries for a light transport matrix according to various embodiments of the invention.

DETAILED DESCRIPTION OF THE PREFERRED EMBODIMENTS

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices, including those systems and devices with display or camera capabilities, multimedia devices, and the like. Aspects of the present invention may be implemented in software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that the various components, or portions thereof, may be divided into separate components or may be integrated together, including integrated within a single system or component.

Furthermore, connections between components/modules within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "an embodiment," or "embodiments," means that a particular feature, structure, characteristic, or function described in connection with the embodiment or embodiments is included in at least one embodiment of the invention and may be in more than one embodiment. The appearances of the phrase "in one embodiment," or "in an embodiment," or "in embodiments," in various places in the specification are not necessarily all referring to the same embodiment or embodiments.

A. Overview

Figure 1:
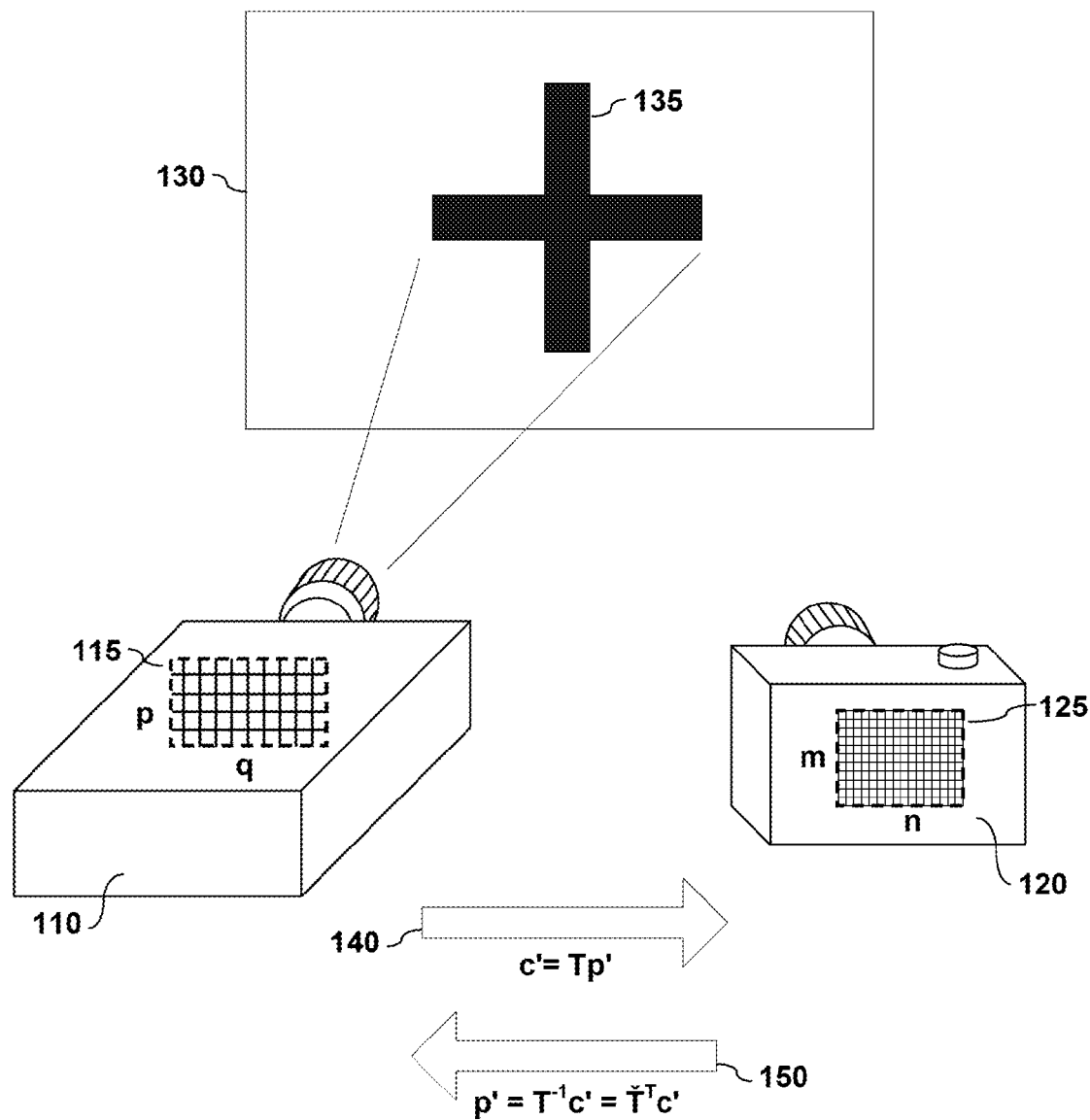
FIG. 1 depicts a projector and camera environment according to various embodiments of the present invention.

Projectors and cameras can be combined to form projector-camera systems that are capable of both projecting and capturing light. The images captured by one or more cameras can be used to estimate attributes about the display environment. In "Dual Photography," *Proceedings ACM SIGGRRAPH*, 2005 (which article is herein incorporated by reference in its entirety), Pradeep Sen et al. discussed that the light transport can be represented by a matrix. Consider, by way of illustration, the projector-camera system 100 of FIG. 1. Depicted in FIG. 1 is a projector 110, an image 135 projected onto a planar screen 130, and a digital camera 120. Light is emitted from the projector 110 and is captured by the camera 120. In the present example, the projector 110 is a digital projector having an array of projector pixels 115 symbolically shown in a dotted box and comprised of p rows and q columns of projector pixels. The size of projector pixel array 115 depends on the resolution of the projector 110. For example, an SVGA resolution may have 800 by 600 pixels (i.e., 480,000 projector pixels), an XVG resolution may have 1024 by 768 pixels (i.e., 786,732 projector pixels), an SXVG resolution may have 1280 by 1024 (i.e., 1,310,720 projector pixels), and so on; with greater resolution, projectors typically requiring a greater number of projector pixels.

In the example depicted in FIG. 1, the camera 120 is a digital camera having an array of light receptor pixels 125 symbolic shown in a dotted box and comprised of m rows and n columns of receptor pixels. The size of receptor pixel array 125 depends on the resolution of the camera 120. It is not uncommon for cameras to have a resolution of 4 MegaPixels (i.e., 4,194,304 receptor pixels), or greater.

Light rays emitting from the projector 110 are directed to the screen 130 and some of them eventually reaches the camera sensor 125. In general, each ray of light is dispersed, reflected, and refracted in the scene and hits the camera sensor at a number of different locations. Thus, the light rays from pixels in the projector reach the camera and forms an m-by-n image, where each pixel i in the camera receives a certain amount of light. If we represent the image projected as a (p×q)×1 vector p' and the image captured as an (m×n)×1 vector c', then the light transport between the projector and camera can be written as:

$$c'=Tp' \quad (1)$$

where T is called the light transport matrix.

To produce a light transport matrix T, a set of p×q projector images can be generated wherein each of them has only one pixel illuminated, the corresponding camera image represents one column of T (e.g., column j):

$$\underbrace{\begin{bmatrix} \\ c'_j \\ \\ \end{bmatrix}}_{mn \times 1} = \underbrace{\begin{bmatrix} & & \overbrace{}^{T}_{col.j} & & \\ c'_1 & \cdots & c'_j & \cdots & c'_{pq} \\ & & & & \end{bmatrix}}_{mn \times pq} \underbrace{\begin{bmatrix} 0 \\ \vdots \\ 1 \\ \vdots \\ 0 \end{bmatrix}}_{pq \times 1} \text{row } j \quad (2)$$

If the camera and projector are exchanged, the relationship between the camera and projector can be represented by the inverse light transport matrix $T^{-1}$ as depicted 150 in FIG. 1.

The inverse light transport matrix $T^{-1}$ is useful for many applications, such as inferring unknown projector images or analyzing the way light bounces in arbitrary scenes. For example, given a projector-camera system such that c=Tp and given c, to infer an unknown p the inverse transport matrix $T^{-1}$ is needed to compute $p=T^{-1}c$. The inverse light transport matrix $T^{-1}$ is, however, much harder to compute than a transpose, requiring much more computational resources. Furthermore, it is not always possible to find the inverse of an arbitrary matrix.

U.S. patent application Ser. No. 11/623,016, filed on Jan. 12, 2007 (Pub. No. US 2007/0171382 A1), which is incorporated by reference herein in its entirety, discloses ways of finding an approximation of the inverse light transport $T^{-1}$. As discussed in that patent document, the inverse of a matrix is not, in general, equal to its transpose. That is, $T^{-1} \neq T^T$. However, for most projector-camera display applications, any two distinct light rays j and k emitting from the projector will typically hit the camera sensor at distinct parts, i.e., there is usually little overlap in the camera sensor pixels hit by light from each of the rays. In a display setup designed to ensure high resolution projections, it is virtually guaranteed that each pixel projected will be distinct from the next. Each column of the transport matrix T is the projection image of one pixel from the projector. Thus, all of the column entries have zero values except those corresponding to the camera pixels hit by the projector pixel. Under the display setting, the camera pixels corresponding to different projector pixels do not overlap with each other. Therefore, the columns of T are orthogonal to each other. To compute at least an approximation of an inverse light transport matrix $T^{-1}$, a matrix $\tilde{T}$ is computed such that:

$$\tilde{T}_i = T_i/(\|T_i\|)^2 \quad i=1, \ldots, pq \quad (3)$$

where $\tilde{T}_i$ is the ith column of $\tilde{T}$ and $T_i$ is the ith column of T.

Since $\tilde{T}_i^T \tilde{T}_i = 1$ and $\tilde{T}_i^T \tilde{T}_j = 0, i \neq j$, yields $\quad (4)$ $$\tilde{T}^T \cong T^{-1} \text{ and} \quad (5)$$

$$p \cong \tilde{T}^T c. \quad (6)$$

Thus, instead of directly computing the inverse, the transpose of an orthogonal matrix can be used as an approximation for the inverse of the light transport matrix. The matrix, $\tilde{T}$, may be referred to herein as the view projection matrix. In other words, the view projection matrix is the orthogonal version of the light transport matrix under display constraints. It should be noted that only part of the projector pixels that actually hit the camera sensor can be recovered. For the projector pixels not hitting any of the camera pixels, the corresponding columns in T contain purely zeros and Equation (3) is undefined. In such cases, the corresponding columns in $\tilde{T}$ are set as zero columns. Thus, $\tilde{T}^T$ is the inverse of the part of $\tilde{T}$ that covers the overlapping area of the fields of views of the projector and the camera. It only recovers the projector pixels in p that fall in the overlapping area and blacks out the other pixels.

B. Method Embodiments

FIG. 2 depicts a method 200 for obtaining a light transport matrix and at least an approximation of an inverse of the light transport matrix according to various embodiments of the invention. The method illustrated in FIG. 2 commences by using the projector to project (205) a set of feature points onto a surface that is assumed to be planar and using the camera to capture (205) the set of feature points. In embodiments, the set of features points may be obtained by displaying and/or capturing one or more images. In embodiments, the set of features comprises four or more feature points. In embodiments, feature points may be one pixel. Having projected and captured the set of at least four feature points, the set of feature points are used (210) to calculate a homography from the camera to the projector.

Figure 3:
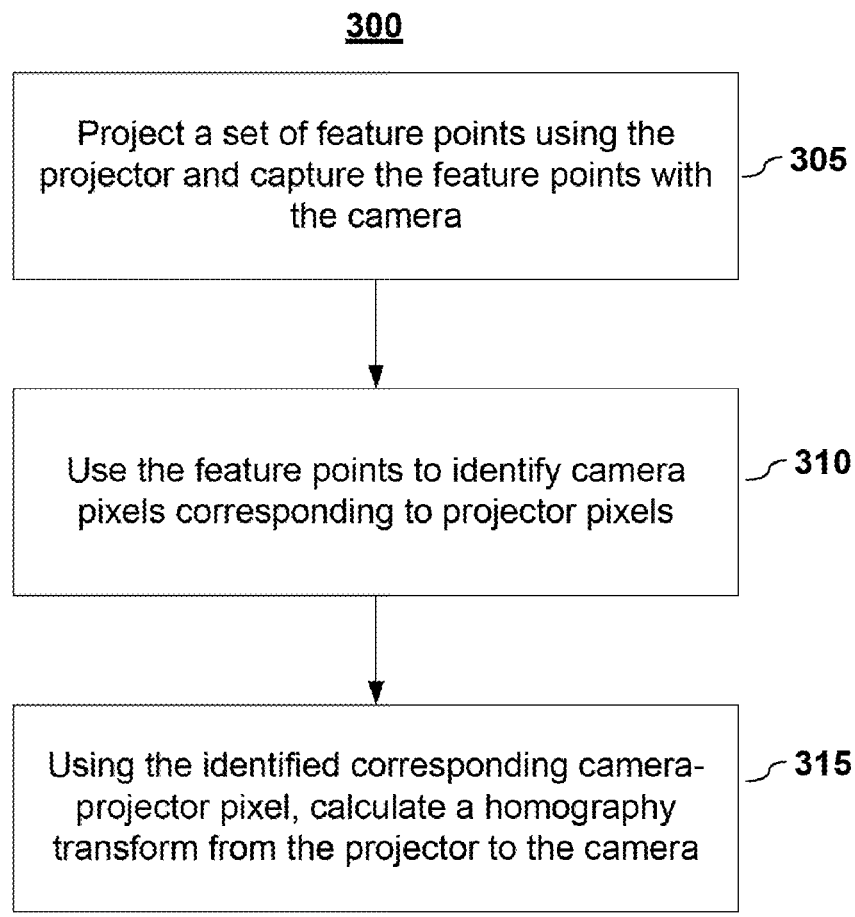
FIG. 3 depicts a method for obtaining a homography transform from a camera to a projector according to various embodiments of the invention.

FIG. 3 depicts a method for obtaining a homography transform from a camera to a projector according to various embodiments of the invention. The feature points projected (305) by the projector and captured (305) by the camera are used to correlate projector pixels to camera pixels. The projector pixels of the features are known, and the corresponding features in the camera are obtained (310) by examining the capture image or images. In embodiments, if a projected feature causes more than one camera pixel to register a value in a region, the camera pixel with a local maximum in a region is selected as the camera pixel that correlates to the projector pixel. Having projected and captured the set of at least four feature points and having used the feature points to correlate projector pixels and camera pixels, a homography from the projector to the camera can be computed (315). In embodiments, the homography transform, $H_{pc}$, may be obtained using the following equation:

$$\underbrace{\begin{bmatrix} wc_x \\ wc_y \\ w \end{bmatrix}}_{p_c} = \underbrace{\begin{bmatrix} h_{11} & h_{12} & h_{13} \\ h_{21} & h_{22} & h_{23} \\ h_{31} & h_{32} & h_{33} \end{bmatrix}}_{H_{pc}} \underbrace{\begin{bmatrix} p_x \\ p_y \\ 1 \end{bmatrix}}_{p_p} \quad (7)$$

where $$p_p = \begin{bmatrix} p_x \\ p_y \\ 1 \end{bmatrix}$$

denotes a projector pixel, $$p_c = \begin{bmatrix} wc_x \\ wc_y \\ w \end{bmatrix}$$

denotes the corresponding camera pixel in an image, w is an arbitrary scale factor, and $h_{33}$ is an arbitrary non-zero value.

Note that Equation (7) may be re-written as follows:

$$c_x = \frac{H_1 p_p}{H_3 p_p} \quad (8)$$

$$c_y = \frac{H_2 p_p}{H_3 p_p} \quad (9)$$

where $H_1$, $H_2$, and $H_3$ are the first, second, and third rows (respectively) of $H_{pc}$.

Given known projector pixels and detected camera pixels, the homography $H_{pc}$ can be directly computed using projector-camera pixel pairs. In embodiments, the homography $H_{pc}$ can be obtained using a least squares solution. As noted previously, the number of features (and therefore the number of projector-camera pixel pairs) is at least four. However, it should be noted that more projector-camera pixel pairs typically yields a more robust homography.

When computing the correspondence between the camera and projector pixel, the index of the row and column could result in a non-integer value due to the different resolutions between the projector and the camera. In embodiments, bilinear interpolation may be used to compute the intensity of camera pixels to improve smoothness. Assume, for purposes of illustration and not limitation, that a projector pixel ($p_x$=5, $p_y$=7) corresponds to camera pixel ($c_x$=6.2, $c_y$=7.5). Since there is no entry for non-integer index in the camera image matrix, bilinear interpolation using the surrounding four (4) image pixels (($c_x$=6, $c_y$=7), ($c_x$=6, $c_y$=8), ($c_x$=7, $c_y$=7), and ($c_x$=7, $c_y$=8)) may be used to interpolate the intensity at ($c_x$=6.2, $c_y$=7.5).

Figure 4:
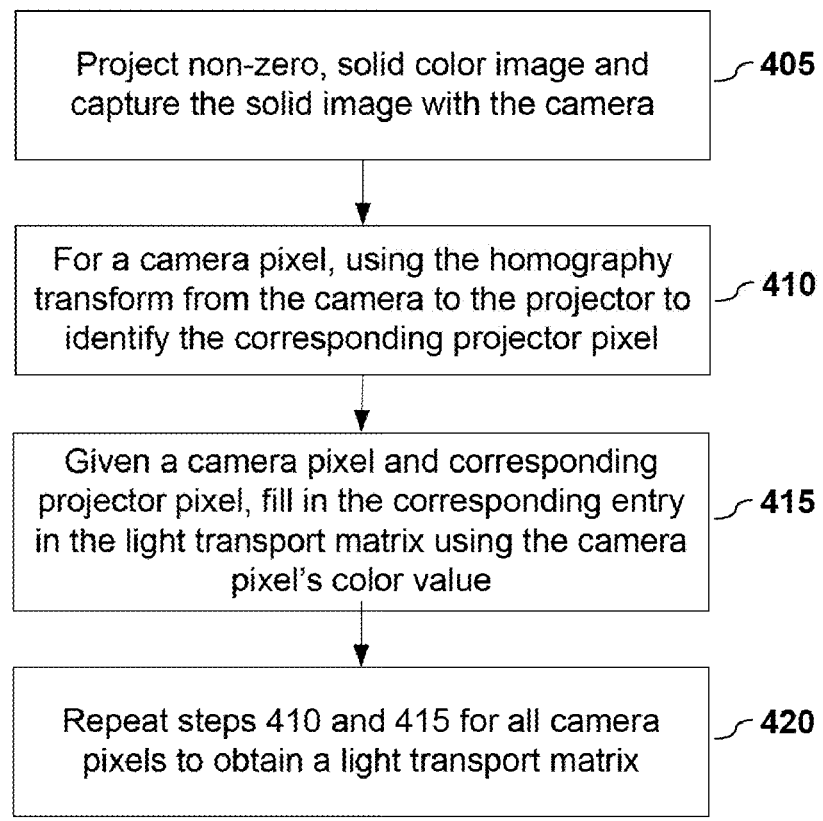
FIG. 4 depicts methods for obtaining a light transport matrix according to various embodiments of the invention.

Returning to the method depicted in FIG. 2, the next step in the depicted method is to project (215) a solid color image, p', using the projector and capture a corresponding image, c', with the camera. Using color values from the captured solid color image and using the homography transform to identify correspondence between camera pixels and projector pixels, a light transport matrix can be computed (220). FIG. 4 further elaborates on the steps of obtaining the light transport matrix.

Figure 5:
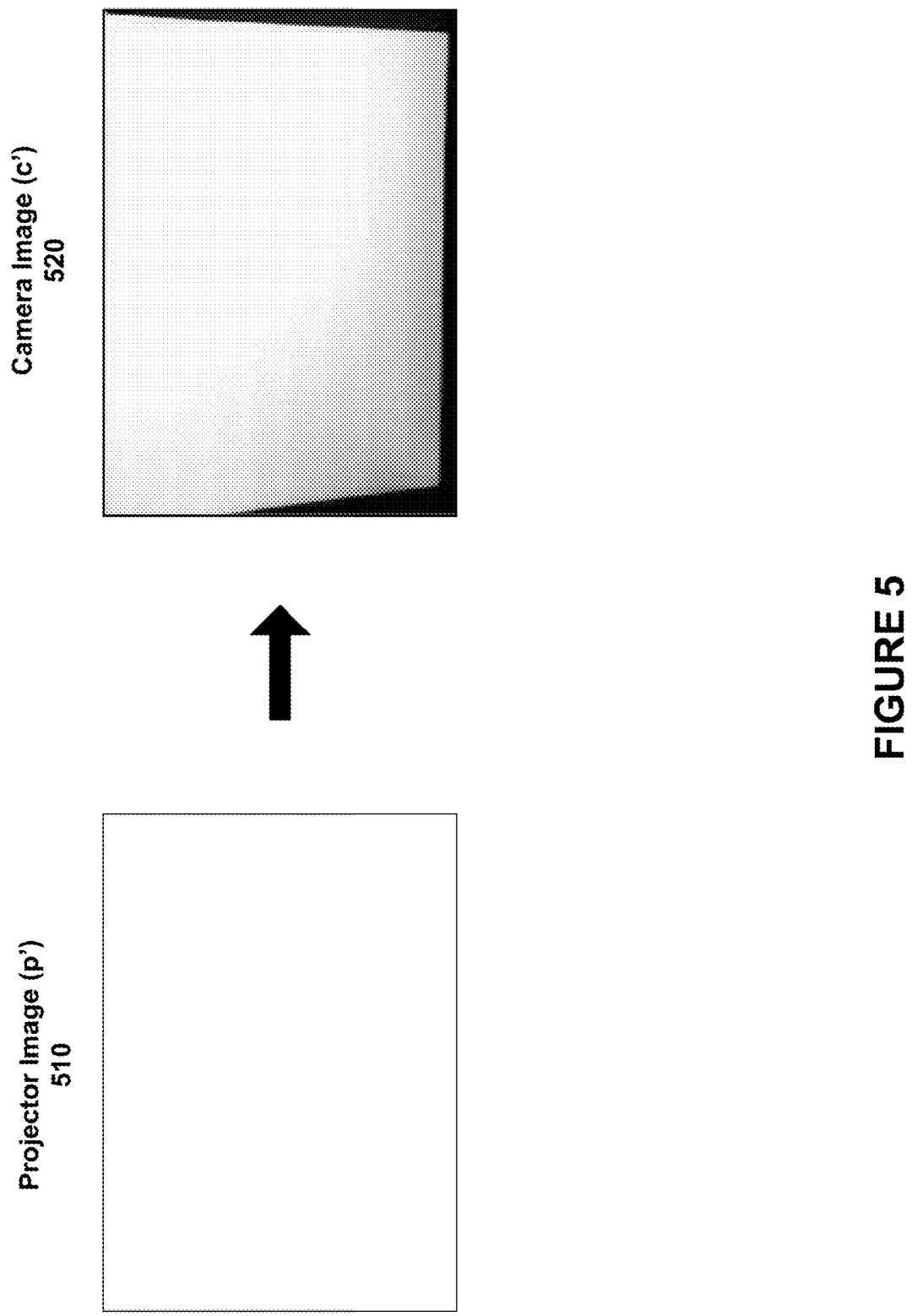
FIG. 5 depicts an example of a homogeneous color projector image and an example of a corresponding captured image according to various embodiments of the invention.

FIG. 4 depicts methods for obtaining a light transport matrix according to various embodiments of the invention. As noted with regard to Step 220, a non-zero (i.e., not black), solid color image is projected using the projector and a corresponding image is captured (405) with the camera. FIG. 5 depicts an example of a homogeneous color projector image 510 and an example of a corresponding captured image 520 according to various embodiments of the invention. In the depicted example, the solid color is white, although other colors could be used.

Using color values from the captured solid color image and using the homography transform from the camera to the projector to identify correspondence between camera pixels and projector pixels, a light transport matrix can be generated. Typically, the camera's resolution will be higher than the projector's resolution; therefore, one projector pixel may correspond to a set of camera pixels. In other words, the projector to camera is one-to-many correspondences. In such embodiments, it is beneficial to compute the homography, $H_{cp}$, from the camera to the projector. The homography transform, $H_{pc}$, that was previously calculated using the feature points is the homography transform from the projector to the camera. The inverse of that transform represents the homography transform of the camera to the projector. That is, given a camera pixel, the homography transform of the camera to the projector, $H_{cp}$, can be used to find the corresponding projector pixels according to the following equation:

$$\underbrace{\begin{bmatrix} w' p_x \\ w' p_y \\ w' \end{bmatrix}}_{p_p} = \underbrace{\begin{bmatrix} h'_{11} & h'_{12} & h'_{13} \\ h'_{21} & h'_{22} & h'_{23} \\ h'_{31} & h'_{32} & h'_{33} \end{bmatrix}}_{H_{cp}} \underbrace{\begin{bmatrix} c_x \\ c_y \\ 1 \end{bmatrix}}_{p_c} \quad (10)$$

where w' is an arbitrary scale factor, and $h'_{33}$ is an arbitrary non-zero value.

Thus, given a camera pixel, the homography transform from the camera to the projector, $H_{cp}$, can be used to identify the corresponding projector pixel. And, given a camera pixel and its corresponding projector pixel, a corresponding entry in the light transport matrix can be filled in using the camera pixel's color value. Recall that the relationship between the projected image, p', and the corresponding captured image, c', can be expressed as: c'=Tp'. Given the display constraint that any two distinct light rays j and k emitting from the projector hit the camera sensor at distinct parts, the columns of the light transport matrix can be considered to be orthogonal to each other. For projector pixel indexed as j, the corresponding camera image is the jth column of T (see Equation (2)). Since the value of the pixel is 1 for a white image, then the color of each image pixel equals to the value of the row element of the jth column of T:

$$c'_i = T_{i,j} * 1 = T_{i,j} \quad (11)$$

where i denotes rows and j denotes columns.

Thus, the light transport matrix position, $T_{i,j}$ can be filled in with the value $c'_i$.

Consider, by way of illustration and not limitation, the examples depicted in FIG. 6. FIG. 6 graphically illustrates obtaining entries for a light transport matrix according to various embodiments of the invention. In FIG. 6 there is an n×1 vector, c, 610 of color values from the solid color captured image. Also depicted is an m×1 vector, p, 630 representing the projected solid color image. If the solid color image was white, the values in each of the entries in p, is 1. If a non-white color of intensity lower than 1 is used, entries should be filled in with the camera pixel color divided by this solid color in order to normalize the values; thus, Equation (11) still holds.

For the purposes of this example, assume that the camera pixel under investigation is the third pixel 640 and has a normalized color value of $c_3$. And, assume after inputting that camera pixel's position into the inverse homography (see Equation (10)), it is determined that the corresponding projector pixel is $p_2$ 660. Thus, the value at position $T_{32}$ 650 in the light transport matrix 620 is the normalized color value $c_3$.

This process of filling in the entries in the light transport matrix (steps 410 and 415) can be repeated (420) for some portion or all of the camera pixels ($c_1$ through $c_n$) to obtain a light transport matrix, T. In embodiments, entries in the light transport matrix that do not have a correspondence between projector and image pixels are set to zero.

Returning to FIG. 2, once the light transport matrix, T, is obtained, an inverse (or at least an approximation of the inverse) of the light transport matrix can be obtained. In a projector-camera system, the inverse light transport between the projector and the camera can be useful for many display applications. For example, generating a specific projector image that corresponds to a desired display is an application that utilizes an inverse light transport.

Assuming the display constraint that any two distinct light rays emitting from the projector will typically hit the camera sensor at distinct parts, the camera pixels corresponding to different projector pixels do not overlap with each other. Therefore, the columns of the light transport matrix, T, are orthogonal to each other. Given an orthogonal matrix, to compute at least an approximation of an inverse light transport matrix $T^{-1}$, the light transport matrix obtained above is normalized:

$$\tilde{T}_j = T_j/(\|T_j\|)^2 \, j=1,\ldots,pq \qquad (12)$$

where $\tilde{T}_j$ is the jth column of $\tilde{T}$ and where $T_j$ is the jth column of T.

The resultant normalize matrix, $\tilde{T}_j$, is transposed to obtain, at least an approximation of the inverse light transport matrix since $\tilde{T}_i^T \tilde{T}_i = 1$ and $\tilde{T}_i^T \tilde{T}_j = 0$, $i \neq j$. Thus, $\tilde{T}^T \cong T^{-1}$ and $p \cong \tilde{T}^T c$.

It should be noted that the methods discussed above for obtaining a light transport matrix (and in embodiments, its inverse) may be repeated for a different view location. That is, the camera may be moved to a different position and a new light transport matrix may be obtained.

C. System Implementations

Figure 7:
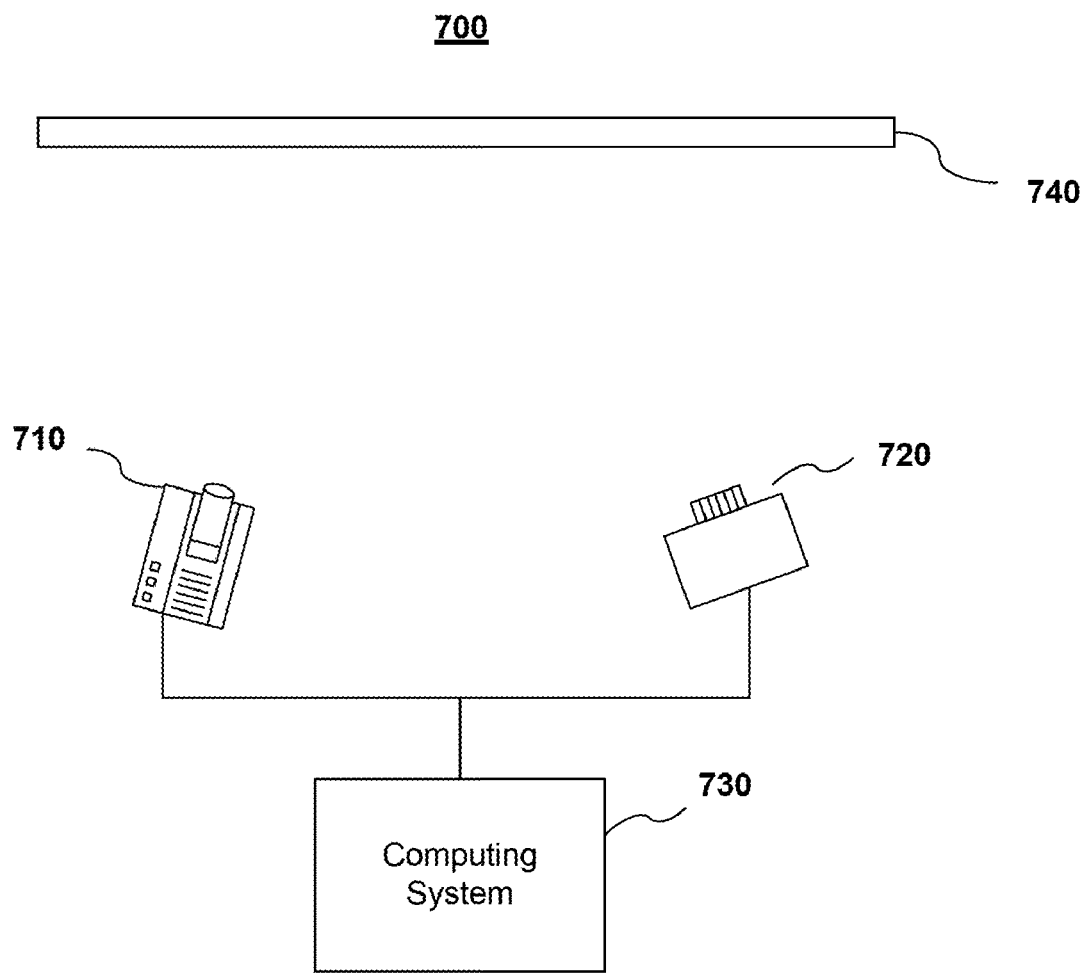
FIG. 7 depicts a projector system according to various embodiments of the invention.

FIG. 7 depicts a projector system 700 according to various embodiments of the invention. Shown in FIG. 7 is a projector 710, a camera 720, a computing system 730 communicatively coupled to both of them, and a planar screen 740. In embodiments, the computing system controls both the projector 710 and the camera 720. In embodiments, the computing system may be contained in or integrated with the projector, the camera, or some combination thereof.

In embodiments, the computing system 730 is configured to perform any of the methods presented above. For example, in embodiments, the computing system 730 can obtain a light transport matrix by causing the projector 710 to display a set of feature points upon the planar screen 740. The computer system 730 captures the set of features in one or more images using the camera 720. The computer system 730 examines the captured image or images to identify the corresponding captured set of features. For example, the computing system 730 may cause the projector to display a first set of lines and capture a first image using the camera 720. The computing system 730 may repeat those steps with a second set of lines that are orthogonal to the first set of lines. The intersection of the two set of lines form feature points. The feature point pixel locations in the projector are known, and the camera pixel locations of the feature points can be identified, in embodiments, by adding the pixel values of the first and second images together and identifying the pixel with a local maximum within each of a set of regions. One skilled in the art shall recognize that there a number of ways to correlated feature points between a projector and a camera, and no particular method is critical to the present invention. For example, identifying feature points using unique color patterns may also be used to correlate feature points between the projector and the camera as described in to U.S. patent application Ser. No. 12/329,099, entitled "Color-Based Feature Identification," filed on Dec. 5, 2008, which is incorporated herein by reference in its entirety.

Using the correlated feature points, the computing system 730 can calculate a homography from the projector to the camera and its inverse. The computing system 730 can also cause the projector 710 to project a solid color image and can capture an image of the projected solid color image using the camera 720.

Given the homography and the captured image of the solid color projection, the computing system 730 can compute a light transport matrix using color values from the captured image of solid color projection and using the inverse homography transform to identify correspondence between camera pixels and projector pixels. In embodiments, the computing system 730 can also calculate an inverse light transport matrix. The computing system 730 can use the calculated inverse light transport matrix to adjust images for projection by projector 710 so that a viewer at a view location where the camera is or was positioned will see the image as intended.

Figure 8:
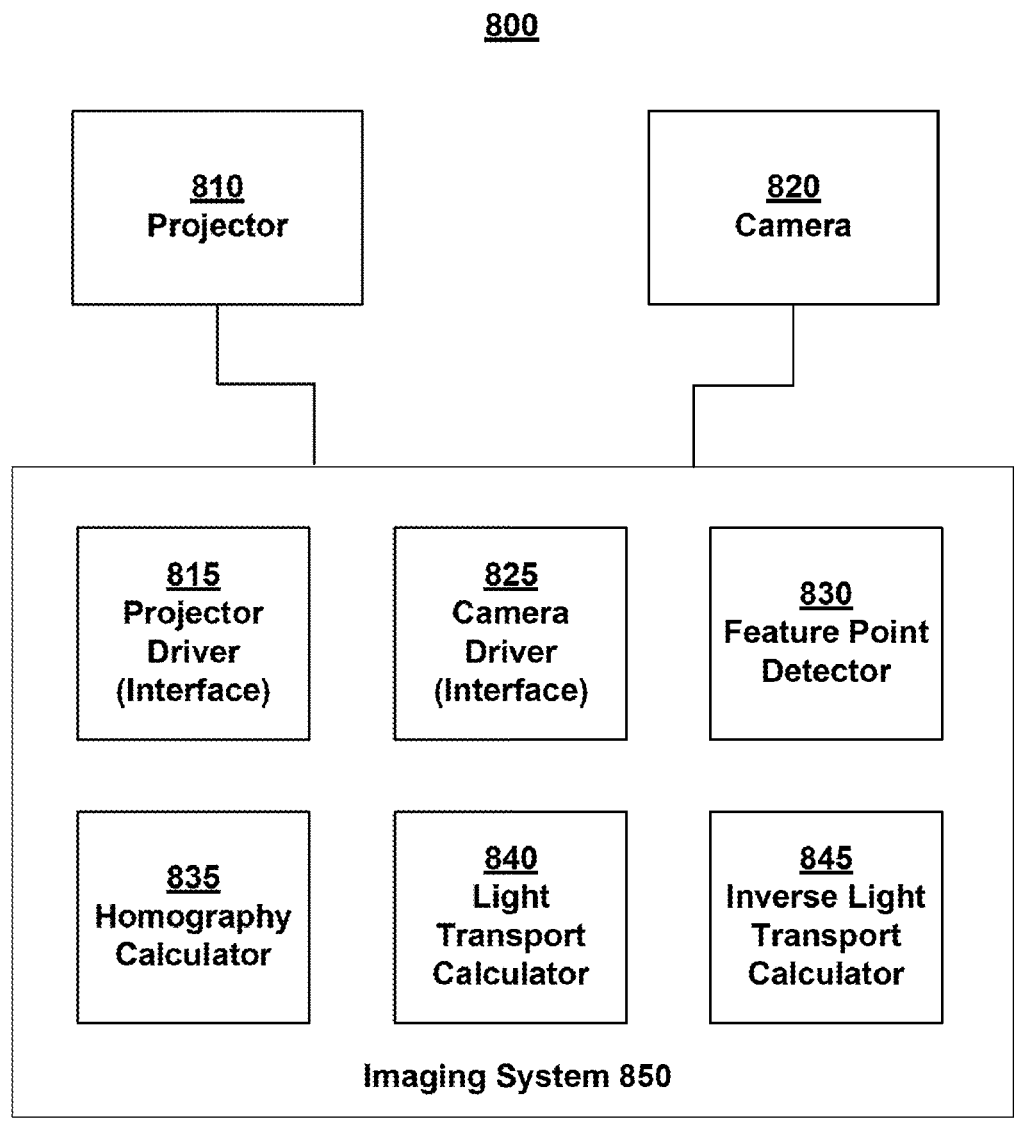
FIG. 8 depicts a projector system according to various embodiments of the invention.

FIG. 8 depicts a projector system according to various embodiments of the invention. Depicted is an imaging, system 850 communicatively coupled to a projector 810 and to a camera 820. In the embodiment depicted in FIG. 8, imaging system 850 comprises a projector driver 815 that interfaces with the projector 810. Projector driver 815 supplies images to the projector 810, including by way of example and not limitation, one or more images comprising a set of features, a solid color image, and images adjusted by an inverse light transform. In the embodiment depicted in FIG. 8, imaging system 850 comprises a camera driver 825 that interfaces with the camera 820. Camera driver 825 receives images from the camera 820, including by way of example and not limitation, one or more images comprising a set of features and an image of the solid color projection.

In embodiments, imaging system 850 also comprises a feature point detector 830 that is communicatively coupled to receive the image or images captured by the camera. Feature point detector 830 examines the captured images to identify the camera pixel locations of the feature points. For example, in embodiments, the projector driver 815 causes the projector 810 to display a first set of lines and camera driver 825 causes the camera 820 to capture a first image. The imaging system 850 repeats those steps with a second set of lines that are orthogonal to the first set of lines. The intersection of the two set of lines form feature points. In embodiments, the feature point detector 830 receives the captured images and adds the pixel values of the first and second images together to identify the pixels with a local maximum. In embodiments, feature point detector 830 receives the feature point locations and uses that information to help locate the features in the captured image or images.

In embodiments, imaging system 850 also comprises a homography calculator 835 that receives the information regarding the feature points correlated between the projector pixels and the captured image pixels. The homography calculator 835 uses the correlated pixel locations to compute a homography transform. In embodiments, the homography transform, $H_{pc}$, may be obtained using Equation (7), which is reproduced below:

$$\underbrace{\begin{bmatrix} wc_x \\ wc_y \\ w \end{bmatrix}}_{p_c} = \underbrace{\begin{bmatrix} h_{11} & h_{12} & h_{13} \\ h_{21} & h_{22} & h_{23} \\ h_{31} & h_{32} & h_{33} \end{bmatrix}}_{H_{pc}} \underbrace{\begin{bmatrix} p_x \\ p_y \\ 1 \end{bmatrix}}_{p_p} \quad (7)$$

where $$p_p = \begin{bmatrix} p_x \\ p_y \\ 1 \end{bmatrix}$$

denotes a projector pixel, $$p_c = \begin{bmatrix} wc_x \\ wc_y \\ w \end{bmatrix}$$

denotes the corresponding camera pixel in an image, w is an arbitrary scale factor, and $h_{33}$ is an arbitrary non-zero value.

Given known projector pixels and detected camera pixels, the homography $H_{pc}$ can be directly computed using projector-camera pixel pairs. In embodiments, the homography calculator 835 uses a least squares solution to obtain the homography $H_{pc}$. As noted previously, the number of features (and therefore the number of projector-camera pixel pairs) is at least four. However, it should be noted that more projector-camera pixel pairs typically yields a more robust homography. In embodiments, the homography calculator also calculates an inverse of the homography transform, $H_{cp}$.

In embodiments, imaging system 850 also comprises a light transport calculator 840 that computes a light transport matrix using color values from a captured solid color image and using the inverse homography transform in order to identify correspondence between camera pixels and projector pixels information. In embodiments, the light transport calculator 840 obtains the light transport matrix using the method disclosed with respect to FIG. 4. Namely, given a camera pixel and corresponding projector pixel, light transport calculator 840 fills in the corresponding entry in the light transport matrix based upon the camera pixel's normalized color value.

In embodiments, imaging system 850 also comprises an inverse light transport calculator 845 that receives the light transport matrix and computes at least an approximation of an inverse light transport. In embodiments, the inverse light transport calculator 845 computes at least an approximation of the inverse light transport by normalizing the light transport matrix and transposing it. In embodiments, the resulting inverse light transport is supplied to the projector driver 815, wherein images are adjusted using the inverse light transport so that the projected images are correctly viewed at a view location in the area of the camera. In embodiments, after obtaining the inverse light transport, the camera may be removed or relocated, wherein the camera's former location becomes a view location for a viewer or viewers. It should be noted that the imaging system may be integrated with or a part of the projector 810, the camera 820, or the modules may be divided between the two devices.

D. Computing System Implementations

It shall be noted that the present invention may be implemented in any instruction-execution/computing device or system capable of processing image data, including without limitation, a general-purpose computer and a specific computer, such as one intended for data or image processing. It shall be noted that aspects of the present invention may also be implemented into other computing devices and systems, including without limitation, a digital camera, a projector, a multimedia device, and any other device that projects, processes, captures, transmits, or stores an image. Furthermore, within any of the devices, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 9:
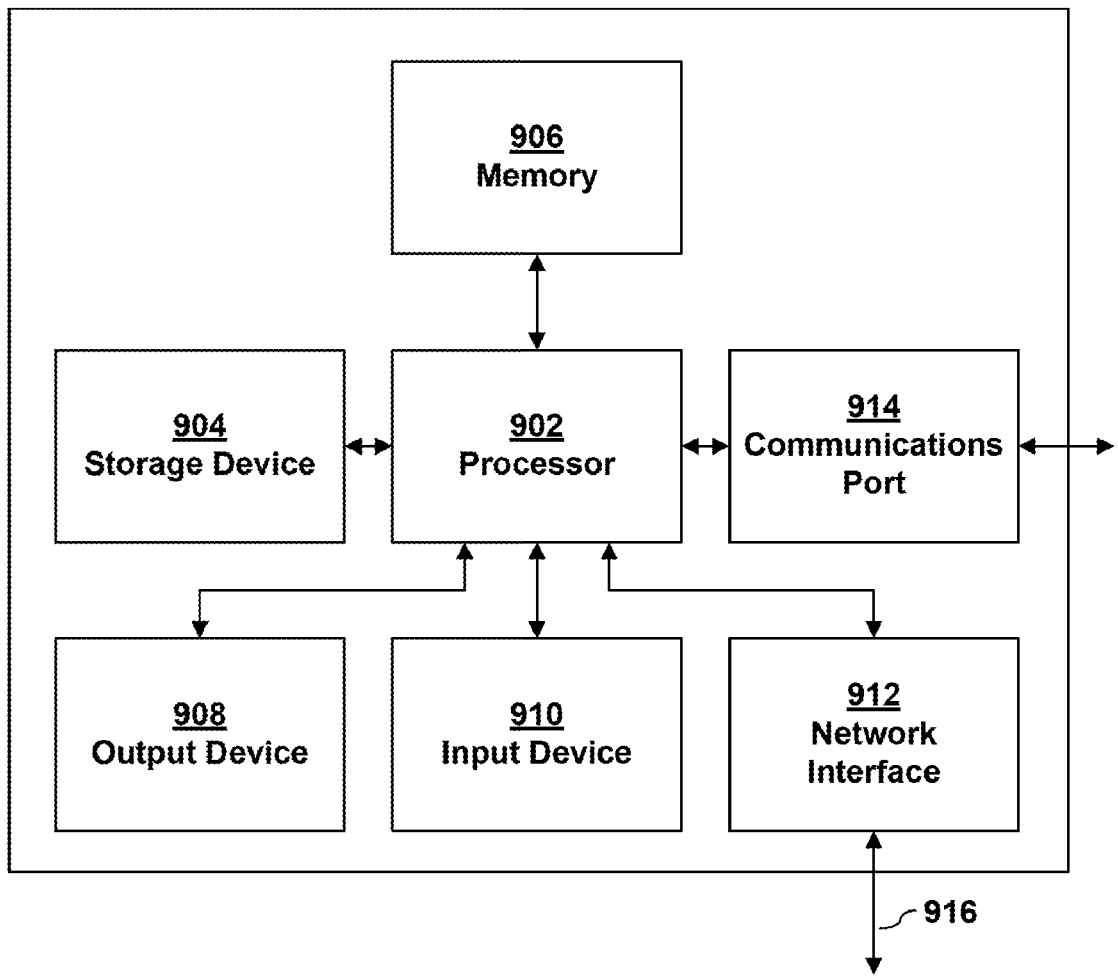
FIG. 9 depicts a computing system according to various embodiments of the invention.

FIG. 9 depicts a functional block diagram of an embodiment of an instruction-execution/computing device 900 that may implement or embody embodiments of the present invention. As illustrated in FIG. 9, a processor 902 executes software instructions and interacts with other system components. In an embodiment, processor 902 may be a general purpose processor such as (by way of example and not limitation) an AMD processor, an INTEL processor, a SUN MICROSYSTEMS processor, or a POWERPC compatible-CPU, or the processor may be an application specific processor or processors. A storage device 904, coupled to processor 902, provides long-term storage of data and software programs. Storage device 904 may be a hard disk drive and/or another device capable of storing data, such as a computer-readable media (e.g., diskettes, tapes, compact disk, DVD, and the like) drive or a solid-state memory device. Storage device 904 may hold programs, instructions, and/or data for use with processor 902. In an embodiment, programs or instructions stored on or loaded from storage device 904 may be loaded into memory 906 and executed by processor 902. In an embodiment, storage device 904 holds programs or instructions for implementing an operating system on processor 902. In one embodiment, possible operating systems include, but are not limited to, UNIX, AIX, LINUX, Microsoft Windows, and the Apple MAC OS. In embodiments, the operating system executes on, and controls the operation of, the computing system 900.

An addressable memory 906, coupled to processor 902, may be used to store data and software instructions to be executed by processor 902. Memory 906 may be, for example, firmware, read only memory (ROM), flash memory, non-volatile random access memory (NVRAM), random access memory (RAM), or any combination thereof. In one embodiment, memory 906 stores a number of software objects, otherwise known as services, utilities, components, or modules. One skilled in the art will also recognize that storage 904 and memory 906 may be the same items and function in both capacities. In an embodiment, one or more of the components of FIG. 8 may be modules stored in memory 904, 906 and executed by processor 902.

In an embodiment, computing system 900 provides the ability to communicate with other devices, other networks, or both. Computing system 900 may include one or more network interfaces or adapters 912, 914 to communicatively couple computing system 900 to other networks and devices. For example, computing system 900 may include a network interface 912, a communications port 914, or both, each of which are communicatively coupled to processor 902, and which may be used to couple computing system 900 to other computer systems, networks, and devices.

In an embodiment, computing system 900 may include one or more output devices 908, coupled to processor 902, to facilitate displaying graphics and text. Output devices 908 may include, but are not limited to, a display, LCD screen, CRT monitor, printer, touch screen, or other device for displaying information. Computing system 900 may also include a graphics adapter (not shown) to assist in displaying information or images on output device 908.

One or more input devices 910, coupled to processor 902, may be used to facilitate user input. Input device 910 may include, but are not limited to, a pointing device, such as a mouse, trackball, or touchpad, and may also include a keyboard or keypad to input data or instructions into computing system 900.

In an embodiment, computing system 900 may receive input, whether through communications port 914, network interface 912, stored data in memory 904/906, or through an input device 910, from a scanner, copier, facsimile machine, or other computing device.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a computer. Examples of program modules include libraries, programs, routines, objects, components, and data structures. In distributed computing environments, program modules may be physically located in settings that are local, remote, or both.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A method for configuring a projector system comprising a projector and using a camera, the projector and the camera each comprising an array of pixels, the method comprising:
   projecting, using the projector, a set of features on a surface assumed to be planar;
   capturing the set of features using the camera;
   using the set of features to calculate a homography transform from the projector pixels to the camera pixels;
   projecting a homogeneous color image using the projector;
   capturing an image of the projected homogenous color image using the camera; and
   for each camera pixel of a set of camera pixels, using an inverse of the homography transform to identify a corresponding projector pixel and adding a color value based upon color information of the camera pixel from the captured image of the homogenous color image to a corresponding entry in a light transport matrix that has a row position equal to a row position of the camera pixel and has a column position equal to a row position of the corresponding projector image pixel.

2. The method of claim 1 further comprising the step of:
   using the light transport matrix to obtain at least an approximation of an inverse of the light transport matrix.

3. The method of claim 2 wherein the at least an approximation of an inverse of the light transport matrix is obtained by performing the steps comprising:
   normalizing the light transport matrix; and
   transposing the normalized light transport matrix.

4. The method of claim 2 wherein the at least an approximation of an inverse of the light transport matrix is used to alter an image that is to be projected using the projector.

5. The method of claim 1 wherein the set of features comprises at least four feature points.

6. A non-transitory computer-readable medium carrying one or more sequences of instructions, wherein execution of the one or more sequences of instructions by one or more processors causes the one or more processors to obtain a light transport matrix between a projector and a view position by performing the steps comprising:
   correlating a first set of camera pixels with a set of projector pixels using a set of features projected by the projector onto a surface that is at least substantially planar and captured by a camera at the view position;
   using the first set of camera pixels that are correlated with the set of projector pixels to calculate a homography transform from the camera pixels to the projector pixels;
   for each camera pixel of a second set of camera pixels, performing the steps comprising:
      using the homography transform to identify a corresponding projector pixel;
      using the camera pixel and the corresponding projector pixel to identify a corresponding entry in the light transport matrix; and
      adding a color value to the corresponding entry in the light transport matrix, the color value being based upon color information of the camera pixel from a captured image of a homogenous color image projected by the projector; and
   using the light transport matrix to obtain at least an approximation of an inverse of the light transport matrix.

7. The non-transitory computer-readable medium of claim 6 wherein the corresponding entry in the light transport matrix is determined from a location of the camera pixel and a location of the projector pixel.

8. The non-transitory computer-readable medium of claim 6 wherein the approximation of an inverse of the light transport matrix is obtained by performing the steps comprising:
normalizing the light transport matrix; and
transposing the normalized light transport matrix.

9. The non-transitory computer-readable medium of claim 6 further comprising the step of:
using the at least an approximation of an inverse of the light transport matrix to alter an image that is to be projected using the projector.

10. The non-transitory computer-readable medium of claim 6 further comprising the steps of:
causing the projector to project the set of features onto the surface that is at least substantially planar;
causing the camera to capture the set of features;
causing the projector to project the homogeneous color image; and
causing the camera to capture the captured image of the homogenous color image projected by the projector.

11. The non-transitory computer-readable medium of claim 6 wherein the steps are repeated for a different view position.

12. The non-transitory computer-readable medium of claim 6 wherein the step of using the first set of camera pixels that are correlated with the set of projector pixels to calculate a homography transform from the camera pixels to the projector pixels comprises the steps of:
using the first set of camera pixels that are correlated with the set of projector pixels to calculate a homography transform from the projector pixels to the camera pixels; and
computing an inverse of the homography transform from the projector pixels to the camera pixels to obtain the homography transform from the camera pixels to the projector pixels.

13. A system for obtaining a light transport matrix between a view position and a projector, the system comprising:
a feature point detector that correlates a first set of camera pixels with a set of projector pixels using a set of features projected by the projector on a surface that is at least substantially planar and captured by a camera at the view position;
a homography calculator, communicatively coupled to receive the correlated first set of camera pixels and projector pixels, that uses the first set of camera pixels that are correlated with the set of projector pixels to obtain a homography transform between the camera pixels and the projector pixels;
a light transport calculator, communicatively coupled to receive the homography transform between the camera pixels and the projector pixels, that, for each camera pixel of a second set of camera pixels, performs the steps comprising: using the homography transform to identify a corresponding projector pixel; using the camera pixel and the corresponding projector pixel to identify a corresponding entry in a light transport matrix relating the camera to the projector; and adding a color value to the corresponding entry in the light transport matrix, the color value being based upon color information at the camera pixel selected from a captured image of a homogenous color image projected by the projector; and
an inverse light transport calculator, communicatively coupled to receive the light transport matrix, that computes at least an approximation of an inverse of the light transport matrix.

14. The system of claim 13 further comprising:
a projector driver, communicatively coupled to receive the at least an approximation of an inverse of the light transport matrix, that adjusts an image for projection according to the at least an approximation of an inverse of the light transport matrix.

15. The system of claim 13 further comprising:
a projector driver, communicatively coupled to the projector, that causes the projector to project the set of features on the surface that is at least substantially planar and that causes the projector to project the homogeneous color image; and
a camera driver, communicatively coupled to the camera, that causes the camera to capture the set of features and that causes the camera to capture the captured image of the homogenous color image projected by the projector.

16. The system of claim 13 wherein the homography calculator obtains a homography transform between the camera pixels and the projector pixels by performing the steps comprising:
using the first set of camera pixels that are correlated with the set of projector pixels to calculate a homography transform from the projector pixels to the camera pixels; and
computing an inverse of the homography transform between the camera pixels and the projector pixels to obtain the homography transform between the camera pixels and the projector pixels.

* * * * *